Dec. 25, 1956  H. A. HADLEY  2,775,444
DAMPENING DEVICES
Filed Dec. 11, 1951
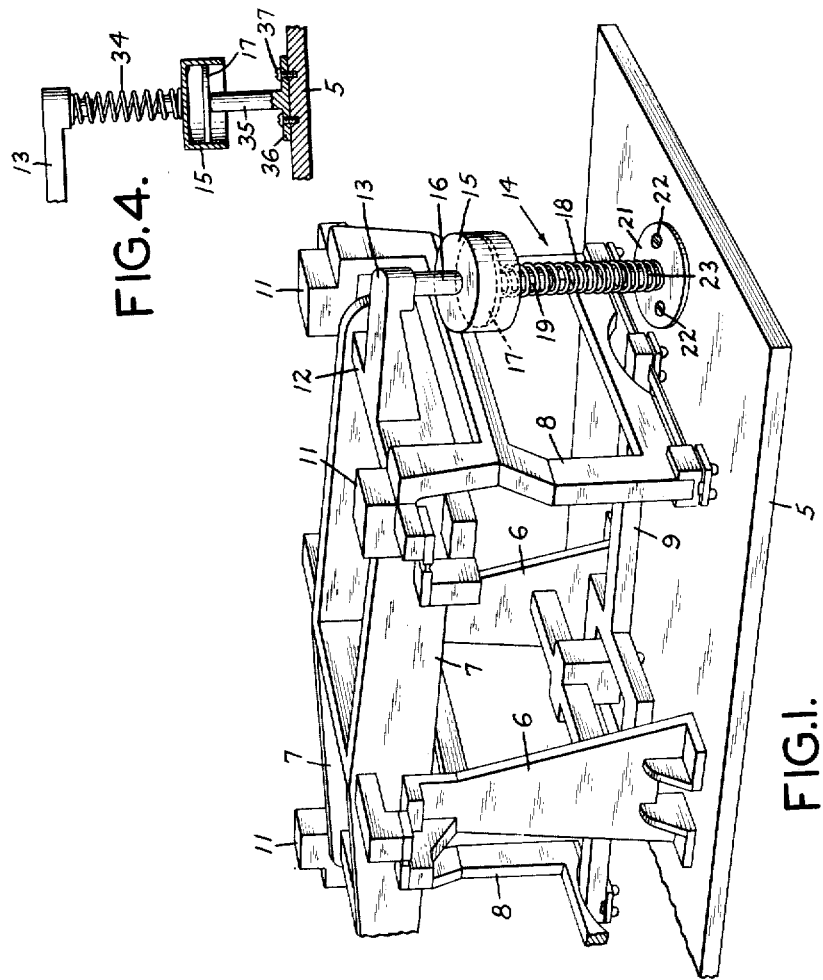
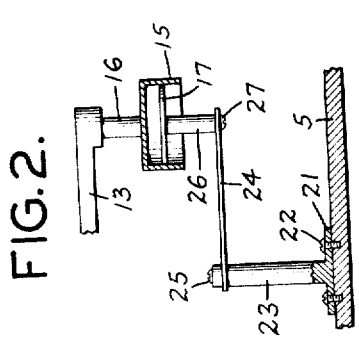
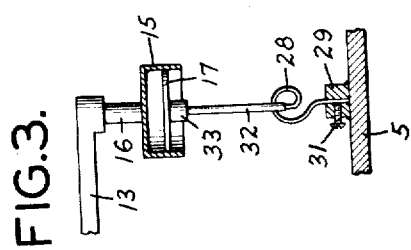
INVENTOR.
HARLAN A. HADLEY
BY
Henry Sherman
ATTORNEY.

United States Patent Office 2,775,444
Patented Dec. 25, 1956

2,775,444

DAMPENING DEVICES

Harlan A. Hadley, Burlington, Vt., assignor to Metrogram Corporation of America, a corporation of Vermont Application December 11, 1951, Serial No. 261,060

14 Claims. (Cl. 267—1)

This invention relates to improvements in means for dampening the vibration of a movable element, and relates more particularly to a novel dashpot construction. While this invention is of general application where dampening devices are applicable, it will be shown and described in connection with its application to a weighing mechanism.

Weighing scales are normally equipped with a dashpot to dampen the movement of the lever system so that the indicator which is operatively connected to the lever system may come to rest after a change is made in the load on the weighing scale. Usually, the dashpot comprises a cylinder, which may or may not contain a liquid, and a piston operating within the cylinder. To obtain satisfactory dampening of the lever system, the thin disc, which with a suitable stem forms the plunger, must have a relatively close fit with the inner wall of the cylinder. When the weighing scale is in exactly level position, the dashpot performs satisfactorily. However, when the weighing scale is in an out-of-level position the plunger plumbs itself, thus causing rubbing friction to occur between the periphery of the plunger disc and the wall of the cylinder which introduces friction in the weighing scale with consequent reduction in the accuracy thereof.

It is an important object of this invention to provide an improved dampening device for checking and controlling the vibration of a movable element which will be free from the foregoing and other disadvantages and which will be especially simple, durable and inexpensive in construction and efficient in operation.

Another object of this invention is the provision of a novel dashpot construction wherein the plunger operating within the cylinder, or the cylinder, is resiliently supported.

A further object of this invention is the provision of a novel spring arrangement for supporting the plunger operating within the cylinder of a dashpot.

Other objects of this invention, together with certain details of construction and combinations of parts will appear from the accompanying description and will be pointed out in the appended claims.

In the drawings wherein the preferred embodiments of this invention are shown, and wherein like reference numerals indicate like parts, Figure 1 is a perspective view of an equal arm weighing scale, partly broken off, showing the dashpot of this invention attached thereto, Figure 2 is a detail view, partly in section, showing a modified form of this invention, Figure 3 is a detail view, partly in section, showing another modification of this invention, and Figure 4 is a detail view, partly in section, showing a modified form of invention wherein the cylinder, rather than the plunger, is resiliently supported.

Referring now to the drawings in detail, and particularly to Figure 1, the dampening device of my invention is shown in connection with an equal arm weighing scale. It is to be understood, however, that the dampening device may be incorporated in any mechanism where a vibration dampening effect is desired.

The weighing scale shown in Figure 1, forming no part of this invention, will be described only in such detail as is necessary to show how the dampening device of the invention is incorporated therein. This weighing scale comprises a base 5 on which fulcrum stands 6 are mounted. The fulcrum stands pivotally support a lever 7 which is provided with suitable load pivots on which end parallels 8 are supported. The end parallels are operatively connected by means of a check link 9. The load receiving platforms or the like may be attached to the blocks 11 integral with or fixed to lever 7. A cross-bar 12 of lever 7 is provided with an arm 13, the purpose of which will be described hereinafter.

The dashpot assembly, generally indicated by reference numeral 14, employed in Figure 1 to dampen the oscillations or vibrations of the weighing mechanism effected by a change in the load thereon comprises a cup-shaped body or cylinder 15 secured at its upper or closed end to a lug 16 depending from arm 13. The dashpot is provided with a plunger assembly comprising a plunger disc 17 which may be mounted on any suitable resilient or vibratable element such as a coil spring 18, of any suitable material, preferably metal, which forms the stem of the plunger assembly. To maintain the disc and stem together, the disc 17 is provided with an integral lug 19 which fits within and is held by the convolutes of the coil spring 18. The plunger assembly is supported in operative position relative to the cylinder 15 on a plate 21 fixed to base 5 by means of screws 22, the plate having an integral upright lug 23 which fits within and is held by the convolutes of the coil spring 18. The disc 17 is of such diameter as to have just sufficient clearance within cylinder 15 to move freely therein but not to permit excessive flow of air past the edge of the disc.

In the dashpot assembly described above, the coil spring stem 18 of the plunger assembly is in neutral equilibrium when the weighing scale is in exactly level position. When the weighing mechanism is caused to tip, as by placing the weighing scale on an out-of-level table or bench, the coil-spring stem 18 tends to retain its relation to its other parts thereby tending to maintain the relative position of the disc 17 within the cylinder with respect to the wall thereof. Accordingly, the edge of the disc will not create excessive friction against the wall of the cylinder no matter how out-of-level the weighing scale may be, and the introduction of friction into the weighing mechanism by the dashpot is reduced to a minimum.

An advantage achieved by the use of the dashpot assembly of the instant invention is that no dust, dirt or other foreign matter may fall into the cylinder since the open end faces in a downward direction. Moreover, since the fluid used in the dashpot is air, the dashpot may advantageously be employed in weighing scales used in bakeries and other establishments where contamination of the products by organic liquids or odors thereof is undesirable.

In the modified form of dampening device shown in Figure 2, a flat spring 24, supported in a horizontal position on lug 23, is employed. The flat spring 24 is fixed to the lug 23 by a cap screw 25 and the disc 17 is operatively attached to flat spring 24 by means of a stem 26 soldered to the disc and attached to the flat spring by a screw 27.

In the modification of the dampening device shown in Figure 3, a bent spring 28 supported in a vertical position is employed. One end of bent spring 28 is held in a boss 29 on base 5 by means of a set screw 31, and the other end supports a stem 32 fixed to a collar 33 carried at the underside of plunger disc 17.

In both of the modifications shown in Figures 2 and 3, the cup-shaped body or cylinder 15 is supported from the lever 7 in the same manner as in the form shown in Figure 1. However, in Figure 4 there is shown a modified form where the cylinder 15 is supported on arm 13 by means of a coil spring 34, and the disc 17 is supported on a rigid stem 35 integral with a plate 36 fixed to base 5 by means of screw 37.

The dampening device of this invention operates in the following manner: With the first movement of beam, the spring acts to dampen said movement substantially immediately. Thus, when the movement of the beam causes the cylinder 15 to move downwardly, the air within the cylinder, moves with said cylinder and acts against the disc 17 and against action of the spring to effect an initial dampening of the beam movement. Furthermore movement of beam in the same direction causes the air and spring to act to further dampen the movement of the beam. The movement of the beam in the opposite direction there is a dampening of the movement of the beam effected by a suction action of the air on the disc, which action is opposed by the spring.

Where the spring employed is a coil spring, an additional advantage is obtained. Thus, as the coil spring is compressed or released after compression thereof, it rotates somewhat. This rotation has the effect of rotating the disc attached thereto and freeing the same from contact, if any, with the inner wall of the cylinder and further minimizing the introduction of friction into the weighing scale.

The embodiment of my invention shown and described herein are to be considered merely as illustrative as my invention is susceptible to variation, modification and change, and may have many applications all within the spirit and scope of the appended claims.

What I claim as new and desire to secure by Letters Patent of the United States is:

1. In a weighing mechanism having a lever element and a base element, a dash pot for dampening the oscillations of said lever element, said dash pot comprising a cylindrical member and cooperating therewith a plunger member including a disc spaced from the inner wall of said cylindrical member, said members being mechanically disconnected from each other, one of said members being rigidly attached to one of said elements, and a spring directly attached at one end to the other of said members for resiliently holding said other member in neutral equilibrium so as to permit lateral movement of said other member, the other end of said spring being fixed to the other of said elements.

2. In a weighing mechanism having a lever element and a base element, a dash pot for dampening the oscillations of said lever element, said dash pot comprising a cylindrical member and cooperating therewith a plunger member including a disc spaced from the inner wall of said cylindrical member, said members being mechanically disconnected from each other, one of said members being rigidly attached to one of said elements, and a bent spring directly attached at one end to the other of said members for resiliently holding said other member in neutral equilibrium so as to permit lateral movement of said other member, the other end of said spring being fixed to the other of said elements.

3. In a weighing mechanism having a lever element and a base element, a dash pot for dampening the oscillations of said lever element, said dash pot comprising a cylindrical member and cooperating therewith a plunger member including a disc spaced from the inner wall of said cylindrical member, said members being mechanically disconnected from each other, one of said members being rigidly attached to one of said elements, and a coil spring directly attached at one end to the other of said members for resiliently holding said other member in neutral equilibrium so as to permit lateral movement of said other member, the other end of said spring being fixed to the other of said elements.

4. In a weighing mechanism having a lever element and a base element, a dash pot for dampening the oscillations of said lever element, said dash pot comprising a cylindrical member and cooperating therewith a plunger member including a disc spaced from the inner wall of said cylindrical member, said members being mechanically disconnected from each other, one of said members being rigidly attached to one of said elements, and a substantially vertical bent spring directly attached at one end to the other of said members for resiliently holding said other member in neutral equilibrium so as to permit lateral movement of said other member, the other end of said spring being fixed to the other of said elements.

5. In a weighing mechanism having a lever element and a base element, a dash pot for dampening the oscillations of said lever element, said dash pot comprising a cylindrical member and cooperating therewith a plunger member including a disc spaced from the inner wall of said cylindrical member, said members being mechanically disconnected from each other, one of said members being rigidly attached to one of said elements, and a substantially vertical coil spring directly attached at one end to the other of said members for resiliently holding said other member in neutral equilibrium so as to permit lateral movement of said other member, the other end of said spring being fixed to the other of said elements.

6. In a weighing mechanism having a lever element and a base element, a dash pot for dampening the oscillations of said lever element, said dash pot comprising a cup-shaped member and cooperating with said cup-shaped member a plunger member including a disc spaced from the inner wall of said cup-shaped member, said cup-shaped member and said plunger member being mechanically disconnected from each other, said cup-shaped member being rigidly attached to one of said elements, and a spring directly attached at one end to the other of said members for resiliently holding said other member in neutral equilibrium so as to permit lateral movement of said other member, the other end of said spring being fixed to the other of said elements.

7. In a weighing mechanism having a lever element and a base element, a dash pot for dampening the oscillations of said lever element, said dash pot comprising a cup-shaped member and cooperating with said cup-shaped member a plunger member including a disc spaced from the inner wall of said cup-shaped member, said cup-shaped member and said plunger member being mechanically disconnected from each other, said cup-shaped member being rigidly attached to one of said elements, and a bent spring directly attached at one end to the other of said members for resiliently holding said other member in neutral equilibrium so as to permit lateral movement of said other member, the other end of said spring being fixed to the other of said elements.

8. In a weighing mechanism having a lever element and a base element, a dash pot for dampening the oscillations of said lever element, said dash pot comprising a cup-shaped member and cooperating with said cup-shaped member a plunger member including a disc spaced from the inner wall of said cup-shaped member, said cup-shaped member and said plunger member being mechanically disconnected from each other, said cup-shaped member being rigidly attached to one of said elements, and a coil spring directly attached at one end to the other of said members for resiliently holding said other member in neutral equilibrium so as to permit lateral movement of said other member, the other end of said spring being fixed to the other of said elements.

9. In a weighing mechanism having a lever element and a base element, a dash pot for dampening the oscillations of said lever element, said dash pot comprising a cup-shaped member and cooperating with said cup-shaped member a plunger member including a disc spaced from the inner wall of said cup-shaped member, said cup-shaped member and said plunger member being mechanically disconnected from each other, said cup-shaped member being rigidly attached to one of said elements, and a substantially vertical bent spring directly attached at one end to the other of said members for resiliently holding said other member in neutral equilibrium so as to permit lateral movement of said other member, the other end of said spring being fixed to the other of said elements.

10. In a weighing mechanism having a lever element and a base element, a dash pot for dampening the oscillations of said lever element, said dash pot comprising a cup-shaped member and cooperating with said cup-shaped member a plunger member including a disc spaced from the inner wall of said cup-shaped member, said cup-shaped member and said plunger member being mechanically disconnected from each other, said cup-shaped member being rigidly attached to one of said elements, and a substantially vertical coil spring directly attached at one end to the other of said members for resiliently holding said other member in neutral equilibrium so as to permit lateral movement of said other member, the other end of said spring being fixed to the other of said elements.

11. In a weighing mechanism having a lever element and a base element, a dash pot for dampening the oscillations of said lever element, said dash pot comprising a cup-shaped body having an open end at the bottom thereof and being rigidly attached to said lever element and cooperating with said cup-shaped body a plunger member including a disc spaced from the inner wall of said cup-shaped body, said cup-shaped body and said plunger member being mechanically disconnected from each other, and a spring directly attached at one end to said disc for resiliently holding said disc in neutral equilibrium so as to permit lateral movement of said disc, the other end of said spring being fixed to said base element.

12. In a weighing mechanism having a lever element and a base element, a dash pot for dampening the oscillations of said lever element, said dash pot comprising a cup-shaped body having an open end at the bottom thereof and cooperating with said cup-shaped body a plunger member including a disc spaced from the inner wall of said cup-shaped body and being rigidly attached to said base, said cup-shaped body and said plunger member being mechanically disconnected from each other, and a spring directly attached at one end to said cup-shaped body for resiliently holding said cup-shaped body in neutral equilibrium so as to permit lateral movement of said disc, the other end of said spring being fixed to said lever element.

13. In a weighing mechanism having a lever element and a base element, a dash pot for dampening the oscillations of said lever element, said dash pot comprising a cup-shaped body having an open end at the bottom thereof and being rigidly attached to said lever element and cooperating with said cup-shaped body a plunger member including a disc spaced from the inner wall of said cup-shaped body, said cup-shaped body and said plunger member being mechanically disconnected from each other, and a substantially vertical spring directly attached at one end to said disc for resiliently holding said disc in neutral equilibrium so as to permit lateral movement of said disc, the other end of said spring being fixed to said base element.

14. In a weighing mechanism having a lever element and a base element, a dash pot for dampening the oscillations of said lever element, said dash pot comprising a cup-shaped body having an open end at the bottom thereof and cooperating with said cup-shaped body a plunger member including a disc spaced from the inner wall of said cup-shaped body and being rigidly attached to said base, said cup-shaped body and said plunger member being mechanically disconnected from each other, and a substantially vertical spring directly attached at one end to said cup-shaped body for resiliently holding said cup-shaped body in neutral equilibrium so as to permit lateral movement of said disc, the other end of said spring being fixed to said lever element.

References Cited in the file of this patent

UNITED STATES PATENTS

| Number | Name | Date |
|---|---|---|
| 444,182 | Robinson | Jan. 6, 1891 |
| 529,570 | Thury | Nov. 20, 1894 |
| 923,530 | Jaenichen | June 1, 1909 |
| 1,252,397 | Carter | Jan. 8, 1918 |
| 1,495,559 | Longue | May 27, 1924 |
| 1,643,050 | Blackmore | Sept. 20, 1927 |
| 1,807,825 | Boyer | June 2, 1931 |
| 2,006,255 | Best | June 25, 1935 |
| 2,320,314 | Trask | May 25, 1943 |
| 2,578,138 | Janeway et al. | Dec. 11, 1951 |

FOREIGN PATENTS

| Number | Country | Date |
|---|---|---|
| 465,550 | Great Britain | May 10, 1937 |
| 952,367 | France | May 2, 1949 |

Disclaimer and Dedication 2,775,444.—*Harlan A. Hadley*, Burlington, Vt. DAMPENING DEVICES. Patent dated Dec. 25, 1956. Disclaimer and dedication filed Jan. 2, 1963, by the assignee, *Toledo Scale Corporation*.

Hereby enters this disclaimer and dedication to the public of all claims in said patent.

[*Official Gazette February 19, 1963.*]